(12) United States Patent
Hsiao et al.

(10) Patent No.: US 8,801,258 B2
(45) Date of Patent: Aug. 12, 2014

(54) BACKLIGHT MODULE

(71) Applicant: Shenzhen China Star Optoelectronics Technology Co., Ltd., Shenzhen (CN)

(72) Inventors: Yuchun Hsiao, Shenzhen (CN); Pangling Zhang, Shenzhen (CN); Yue Wu, Shenzhen (CN); Quan Li, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 50 days.

(21) Appl. No.: 13/703,901

(22) PCT Filed: Oct. 19, 2012

(86) PCT No.: PCT/CN2012/083166
§ 371 (c)(1),
(2), (4) Date: Dec. 12, 2012

(87) PCT Pub. No.: WO2014/056247
PCT Pub. Date: Apr. 17, 2014

(65) Prior Publication Data
US 2014/0098565 A1 Apr. 10, 2014

(30) Foreign Application Priority Data

Oct. 9, 2012 (CN) .......................... 2012 1 0381221

(51) Int. Cl.
*F21V 7/04* (2006.01)

(52) U.S. Cl.
USPC ............................................ 362/607; 362/600

(58) Field of Classification Search
USPC ......................................................... 362/606
See application file for complete search history.

(56) References Cited

U.S. PATENT DOCUMENTS

2002/0036905 A1  3/2002  Mabuchi

FOREIGN PATENT DOCUMENTS

| CN | 102566105 A | 7/2012 |
| CN | 202394013 U | 8/2012 |
| CN | 202452298 U | 9/2012 |
| JP | 2012-59607 A | 3/2012 |

*Primary Examiner* — Donald Raleigh
(74) *Attorney, Agent, or Firm* — Cheng-Ju Chiang

(57) ABSTRACT

The present invention provides a backlight module, which includes a backplane, a reflector plate arranged inside the backplane, a light guide plate arranged on the reflector plate, an optic film assembly arranged above the light guide plate, a backlight source arranged inside the backplane and corresponding to the light guide plate, a mold frame mounted to the backplane, and a resilient block wall that is arranged above the backlight source and a light incidence end of the light guide plate and is fixed to the mold frame by means of force-fitting, bonding, or snap fitting. The resilient block wall has a bottom face and a side face perpendicular to the bottom face. The bottom face and the side face are set in tight engagement with an upper surface of the light guide plate and the backlight source.

11 Claims, 6 Drawing Sheets

BACKLIGHT MODULE

BACKGROUND OF THE INVENTION

1. Field of the Invention

The present invention relates to the field of liquid crystal display, and in particular to an anti-leak backlight module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract out light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module comprises a light source, such as a cold cathode fluorescent lamp (CCFL) or a light-emitting diode (LED), which is arranged at the back side of the liquid crystal panel to form a planar light source that directly provides lighting to the liquid crystal panel. The side-edge backlight module comprises a backlighting source of an LED light bar arranged at an edge of a backplane that is located rearward of one side of the liquid crystal panel. The LED light bar emits light that enters a light guide plate (LGP) through a light incident face of the light guide plate and is projected out through a light emergence face of the light guide plate to thereby transmit through an optic film assembly, after being reflected and diffused, to form a planar light source for the liquid crystal panel.

Referring to FIG. 1, with the development of using an LED light bar 100 as a backlighting source, a thin-frame backlight module becomes the trend of the future development. To cope with the thin-frame designs and at the same time to ensure the reliability of an optic film assembly 200, since the width of the optic film assembly 200 that is held down by a mold frame 300 is very small, to prevent the optic film assembly 200 from sliding off the backlight module, the general arrangement is to have the optic film assembly 200 straight extending to the very edge of a light guide plate 400. This arrangement allows the light from the LED light bar 100 to project through gaps between the mold frame 300 and the light guide plate 400 and those between the mold frame 300 and a backplane 500, thereby leading to light leak.

Referring to FIG. 2, to obviate the shortcoming, a currently adopted solution is to attach a white reflection plate 600 on the mold frame 300 at a location corresponding to the light incidence side so as to reflect back light that travels to the gaps between the mold frame 300 and the light guide plate 400 and those between the mold frame 300 and the backplane 500 in order to make the light get into the light guide plate 400 as much as possible to improve luminous efficacy. However, in practice, due to gaps existing between the mold frame 300 and the light guide plate 400 and the LED light, the white reflection plate 600 that is attached to the mold frame 300 cannot completely reflect all the light back into the light guide plate 400. The cooperative effect of the reflection plate 600 and the gaps causes the light from the LED light to travel along light paths that are respectively indicated by circled 1 and circled 2 in the drawings to project out of an upper surface of the light guide plate 400 and an upper surface of the LED light, resulting in light leak.

SUMMARY OF THE INVENTION

An object of the present invention is to provide a backlight module, which comprises a resilient block wall that is set in tight engagement with upper surfaces of a light guide plate and LED lights so as to overcome the problem of light leak at the light incidence side of the backlight module and also improve luminous efficacy of the backlight module.

To achieve the above object, the present invention provides a backlight module, which comprises a backplane, a reflector plate arranged inside the backplane, a light guide plate arranged on the reflector plate, an optic film assembly arranged above the light guide plate, a backlight source arranged inside the backplane and corresponding to the light guide plate, a mold frame mounted to the backplane, and a resilient block wall that is arranged above the backlight source and a light incidence end of the light guide plate and is fixed to the mold frame by means of force-fitting, bonding, or snap fitting. The resilient block wall has a bottom face and a side face perpendicular to the bottom face. The bottom face and the side face are set in tight engagement with an upper surface of the light guide plate and the backlight source.

The backlight source comprises a PCB and a plurality of LED lights mounted on the PCB. The bottom face of the resilient block wall is in tight engagement with upper surfaces of the LED lights. The side face of the resilient block wall is in tight engagement with a surface of the PCB.

The resilient block wall is made of white rubber.

The resilient block wall has an end face that is of an L-shape, which comprises a first upper end section. The mold frame forms a first recess corresponding to the first upper end section. The first upper end section is fit into the first recess to thereby fix the resilient block wall to the mold frame through force fitting.

The resilient block wall has an end face that is of a rectangular shape, which comprises a second upper end section. The mold frame forms a second recess corresponding to the second upper end section. The second upper end section is fit into the second recess to thereby fix the resilient block wall to the mold frame.

The second upper end section forms a plurality of first positioning pegs. The mold frame forms a plurality of first mounting holes corresponding to the first positioning pegs. The plurality of first positioning pegs is respectively fit into the first mounting holes to thereby fix the resilient block wall to the mold frame.

The resilient block wall further comprises a bent section extending from a side face of the second upper end section. The bent section is in tight engagement with an upper surface of the PCB. The resilient block wall is bonded and fixed to the mold frame by a double-sided adhesive tape.

The mold frame forms a third recess corresponding to the second upper end section and the bent section. The resilient block wall is fixed in the third recess by a double-sided adhesive tape.

The second upper end section forms a plurality of second positioning pegs. The mold frame forms a plurality of second mounting holes corresponding to the second positioning pegs. The plurality of second positioning pegs is respectively fit into the second mounting holes to thereby fix the resilient block wall to the mold frame.

The resilient block wall has an end that is arranged as a raised configuration, which comprises a base and a projection formed on the base. The mold frame forms a fourth recess corresponding to the projection. The projection is fit into the fourth recess to thereby fix the resilient block wall to the mold frame. The projection is formed on top of the base or on a corner at the side the base adjacent to the light guide plate.

The present invention also provides a backlight module, which comprises a backplane, a reflector plate arranged inside the backplane, a light guide plate arranged on the reflector plate, an optic film assembly arranged above the light guide plate, a backlight source arranged inside the backplane and corresponding to the light guide plate, a mold frame mounted to the backplane, and a resilient block wall that is arranged above the backlight source and a light incidence end of the light guide plate and is fixed to the mold frame by means of force-fitting, bonding, or snap fitting, the resilient block wall having a bottom face and a side face perpendicular to the bottom face, the bottom face and the side face being set in tight engagement with an upper surface of the light guide plate and the backlight source;

wherein the backlight source comprises a PCB and a plurality of LED lights mounted on the PCB, the bottom face of the resilient block wall being in tight engagement with upper surfaces of the LED lights, the side face of the resilient block wall being in tight engagement with a surface of the PCB;

wherein the resilient block wall is made of white rubber; and wherein the resilient block wall has an end face that is of an L-shape, which comprises a first upper end section, the mold frame forming a first recess corresponding to the first upper end section, the first upper end section being fit into the first recess to thereby fix the resilient block wall to the mold frame through force fitting.

The efficacy of the present invention is that the present invention provides a backlight module, which comprises a resilient block wall that is made of white rubber and possess resiliency and is fixed to a mold frame by means of force-fitting, bonding, or snap fitting to be in tight engagement with upper surfaces of a light guide plate and LED lights to reflect light back into the light guide plate thereby well prevent light from projecting through gaps at the light incidence side so as to overcome the problem of leak occurring at the light incidence side of the backlight module to improve the luminous efficacy of the backlight module.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
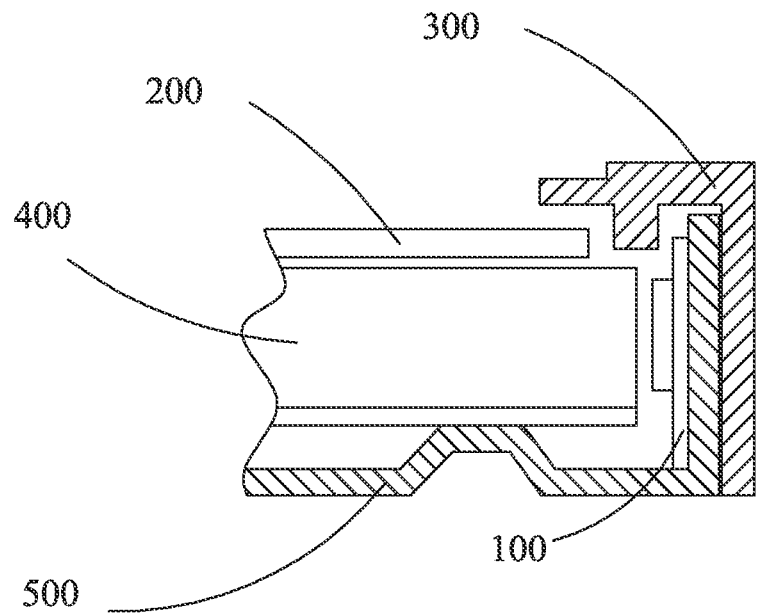
FIG. 1 is a schematic view showing a conventional backlight module.
Figure 2:
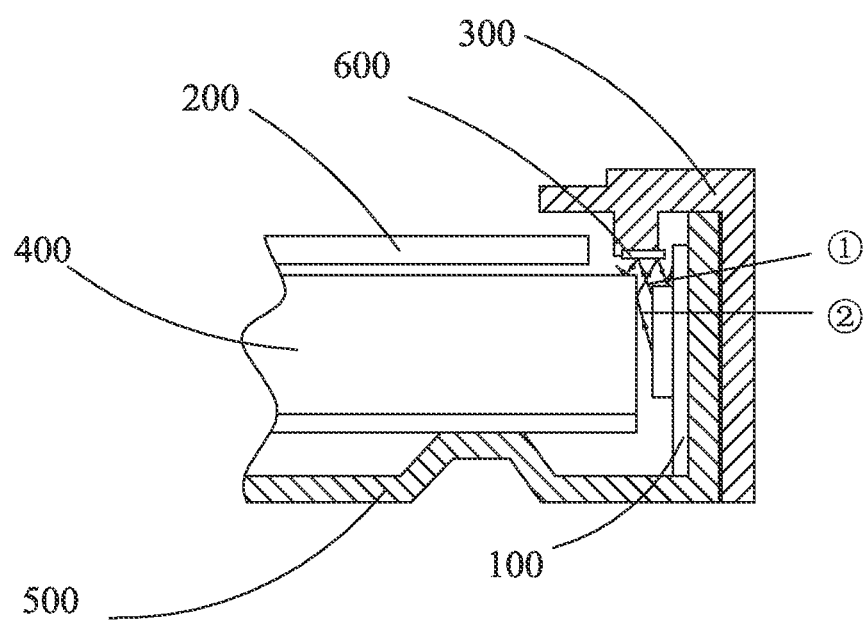
FIG. 2 is a schematic view showing a conventional backlight module that comprises a reflection plate.
Figure 3:
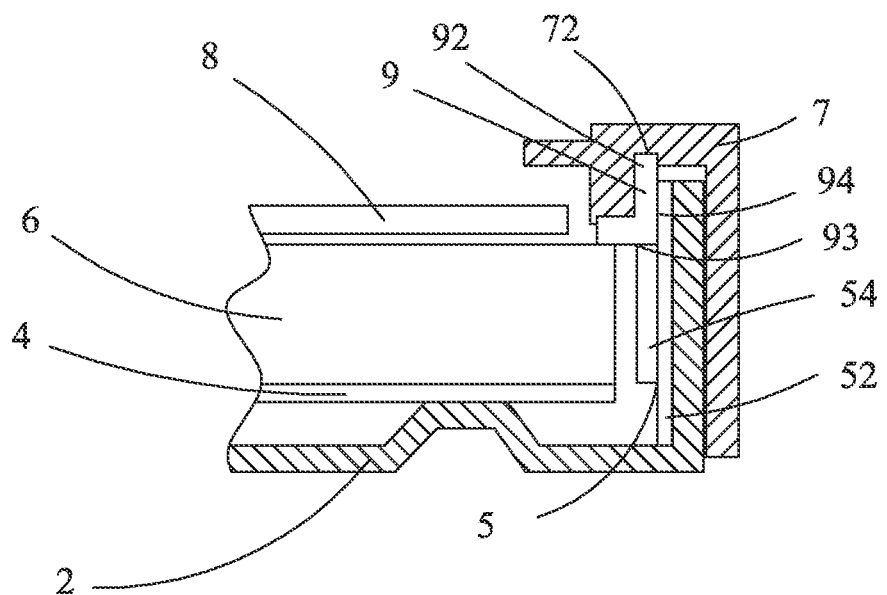
FIG. 3 is a schematic view showing a backlight module according to a first preferred embodiment of the present invention.

Referring to FIG. 3, the present invention provides a backlight module, which comprises a backplane 2, a reflector plate 4 arranged inside the backplane 2, a light guide plate 6 arranged on the reflector plate 4, an optic film assembly 8 arranged above the light guide plate 6, a backlight source 5 arranged inside the backplane 2 and corresponding to the light guide plate 6, a mold frame 7 mounted to the backplane 2, and a resilient block wall 9 that is arranged above the backlight source 5 and a light incidence end of the light guide plate 6 and is fixed to the mold frame 7 by means of force-fitting, bonding, or snap fitting. The resilient block wall 9 has a bottom face 93 and a side face 94 perpendicular to the bottom face 93. The bottom face 93 and the side face 94 are set in tight engagement with an upper surface of the light guide plate 6 and the backlight source 5 to prevent light from leaking and to reflect light into the light guide plate so as to well overcome the problem of light leak at the light incidence side of the backlight module and realizes full use of the light emitting from the backlight source 5 to thereby improve luminous efficacy.

The resilient block wall 9 is preferably made of white rubber and is thus resilient.

The backlight source 5 comprises a printed circuit board (PCB) 52 and a plurality of LED lights 54 mounted on the PCB 52. The plurality of LED lights 54 is electrically connected to the PCB 52. The bottom face 93 of the resilient block wall 9 is set in tight engagement with upper surfaces of the plurality of LED lights 54 and the side face 94 is in tight engagement with a side surface of the PCB 52, whereby a gap-free engagement is established between the resilient block wall 9 and the light guide plate 6 and the backlight source 5.

In the instant first preferred embodiment, the resilient block wall 9 has an end face that is of an L-shape, which comprises a first upper end section 92. The mold frame 7 forms a first recess 72 corresponding to the first upper end section 92. The first upper end section 92 is fit into the first recess 72 to thereby fix the resilient block wall 9 to the mold frame 7 through force fitting. In the instant backlight module, an aluminum extrusion (not shown) is arranged between the backlight source 5 and the backplane 2 and is of an integral configuration to efficiently transmit heat emitting from the backlight source 5 to the backplane 2.

To set up, the first upper end section 92 of the L-shaped resilient block wall 9 is fit into the first recess 72 of the mold frame 7. Then, the mold frame 7 with the resilient block wall 9 fixed thereto is moved downward to mount to the backplane 2 so that after the mounting, the bottom face 93 of the L-shaped resilient block wall 9 is set in tight engagement with the upper surface of the light guide plate 6 and the upper surfaces of the LED lights 54 to provide an effect of preventing light leak. The side face 94 of the L-shaped resilient block wall 9 is in tight engagement with a surface of the PCB 52 to thereby fix and thus prevent the resilient block wall 9 from shifting.

Figure 4:
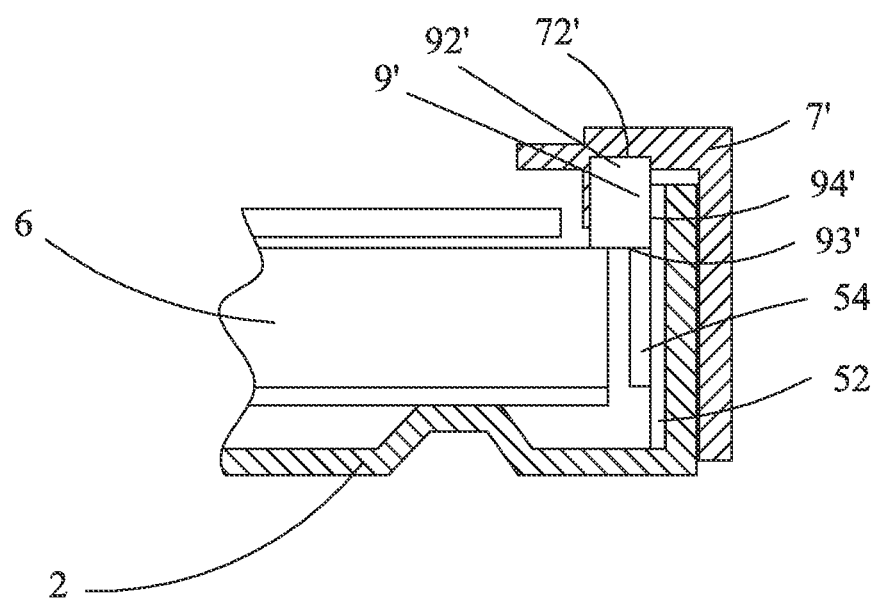
FIG. 4 is a schematic view showing a backlight module according to a second preferred embodiment of the present invention.

Referring to FIG. 4, in a second preferred embodiment that might serve as an alternative solution, the resilient block wall 9' has an end face that is of a rectangular shape, which comprises a second upper end section 92'. The mold frame 7' forms a second recess 72' corresponding to the second upper end section 92'. The second upper end section 92' is fit into the second recess 72' to thereby fix the resilient block wall 9' to the mold frame 7'. In the instant backlight module, an aluminum extrusion (not shown) is arranged between the backlight source 5 and the backplane 2 and is of an integral configuration to efficiently transmit heat emitting from the backlight source 5 to the backplane 2.

To set up, the second upper end section 92' of the rectangular resilient block wall 9' is fit into the second recess 72' of the mold frame. Then, the mold frame 7' with the resilient block wall 9' fixed thereto is moved downward to mount to the backplane 2 so that after the mounting, the bottom face 93' of the rectangular resilient block wall 9' is set in tight engagement with the upper surface of the light guide plate 6 and the upper surfaces of the LED lights 54 to provide an effect of preventing light leak. The side face 94' of the rectangular resilient block wall 9' is in tight engagement with a surface of the PCB 52 to thereby fix and thus prevent the resilient block wall 9' from shifting.

Figure 5:
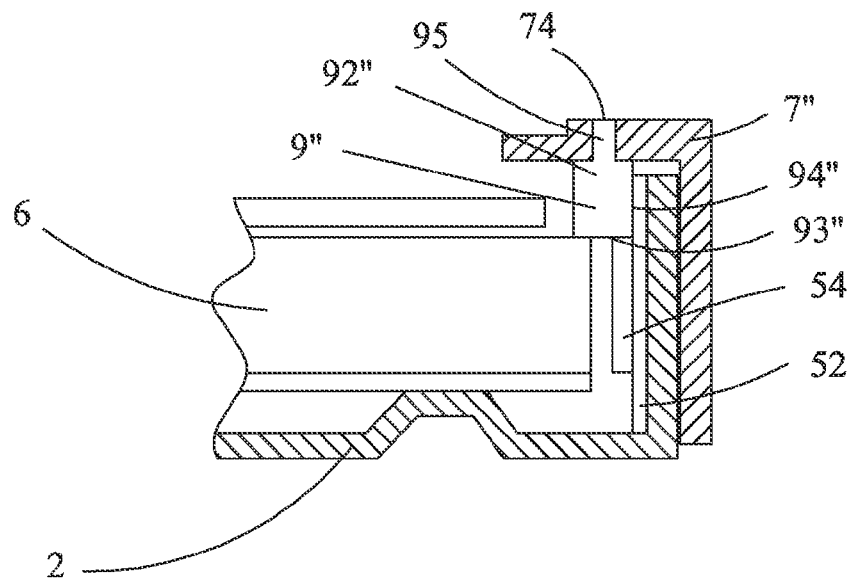
FIG. 5 is a schematic view showing a backlight module according to a third preferred embodiment of the present invention.
Figure 6:
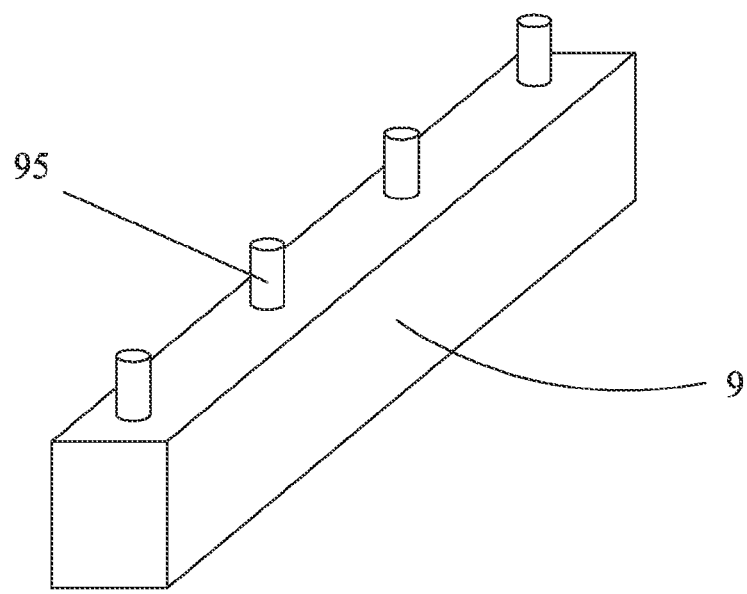
FIG. 6 is a perspective view showing a resilient block wall of FIG. 5.

Referring to FIGS. 5 and 6, a third preferred embodiment is a modification made on the basis of the second preferred embodiment. The second upper end section 92" forms a plurality of first positioning pegs 95. The mold frame 7" forms a plurality of first mounting holes 74 corresponding to the first positioning pegs 95. The plurality of first positioning pegs 95 are respectively fit into the first mounting holes 74 to thereby fix the resilient block wall 9" to the mold frame 7". The first positioning pegs 95 can be shaped pegs, such as cylindrical pegs or rectangular pegs. In the instant preferred embodiment, through fixing the resilient block wall 9" with the first positioning pegs 95, the arrangement of the second recess 72' in the mold frame 7" can be omitted.

To set up, the first positioning pegs 95 of the resilient block wall are fit into the first mounting holes 74. Then, the mold frame 7" with the resilient block wall 9" fixed thereto is moved downward to mount to the backplane 2 so that after the mounting, the bottom face 93" of the resilient block wall 9" is set in tight engagement with the upper surface of the light guide plate 6 and the upper surfaces of the LED lights 54 to provide an effect of preventing light leak. The side face 94" of the resilient block wall 9" is in tight engagement with a surface of the PCB 52 to thereby fix and thus prevent the resilient block wall 9" from shifting.

Figure 7:
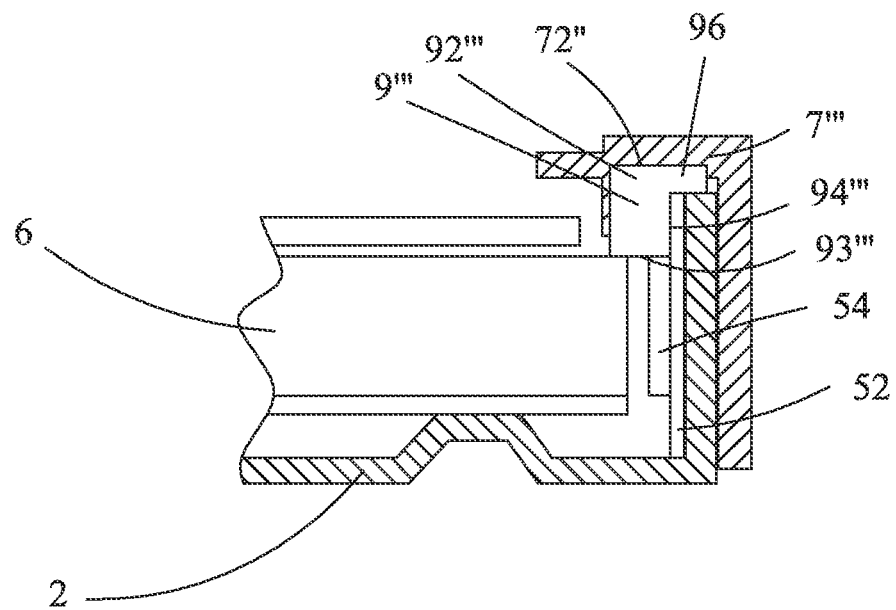
FIG. 7 is a schematic view showing a backlight module according to a fourth preferred embodiment of the present invention.

Referring to FIG. 7, a fourth preferred embodiment is a modification made on the basis of the second preferred embodiment. The resilient block wall 9'" further comprises a bent section 96 extending from a side face of the second upper end section 92'" so that the resilient block wall 9'" is of a bent shape. The bent section 96 is in tight engagement with an upper surface of the PCB 52. With the additionally provided bent section 96, the contact area between the resilient block wall 9'" and the mold frame 7'" is increased so that the resilient block wall 7'" can be bonded and fixed to the mold frame 7'" by a double-sided adhesive tape. The mold frame 7'" forms a third recess 72" corresponding to the second upper end section 92'" and the bent section 96. The resilient block wall 9'" is fixed in the third recess 72" by double-sided adhesive tape or alternatively, the third recess 72" can be omitted so that the resilient block wall 9'" is directly attached to the mold frame 7'". In the instant backlight module, an aluminum extrusion (not shown) that is of a split arrangement is arranged between the backlight source 5 and the backplane 2 to efficiently transmit heat emitting from the backlight source 5 to the backplane 2.

To set up, a piece of double-sided adhesive tape is attached to an upper surface of the second upper end section 9'" and the bent section 96 of the resilient block wall 9'" so that the double-sided adhesive tape may bond the resilient block wall 9'" to a corresponding site or the third recess 72" of the mold frame 7'". Then, the mold frame 7'" with the resilient block wall 9'" bonded thereto is moved downward to mount to the backplane 2 so that after the mounting, the bottom face 93'" of the resilient block wall 9'" is set in tight engagement with an upper surface of and the light guide plate 6 and upper surfaces of the LED lights 54 to provide an effect of preventing light leak. The side face 94'" of the rectangular resilient block wall 9'" is in tight engagement with a surface of the PCB 52 to thereby fix and thus prevent the resilient block wall 9'" from shifting.

Figure 8:
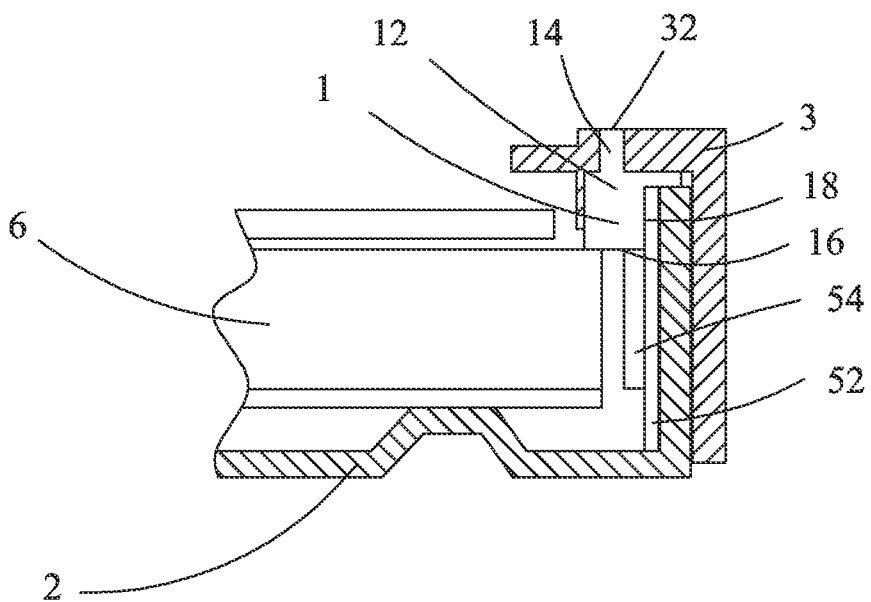
FIG. 8 is a schematic view showing a backlight module according to a fifth preferred embodiment of the present invention.
Figure 9:
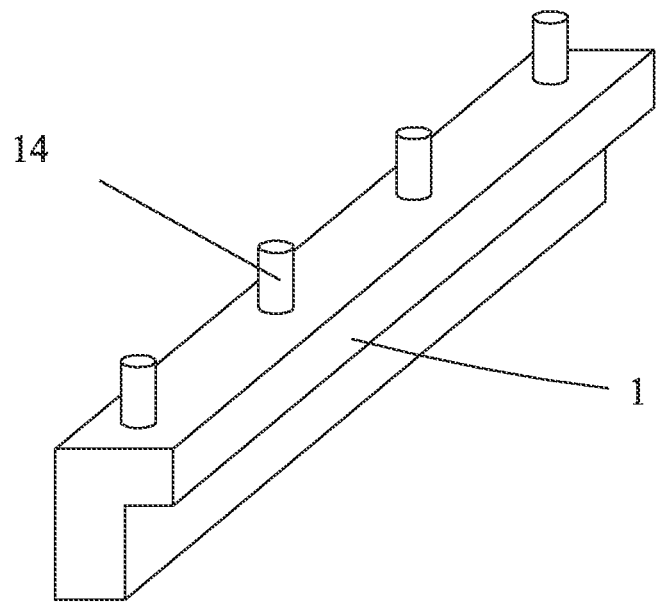
FIG. 9 is a perspective view showing a resilient block wall of FIG. 9.

Referring to FIGS. 8 and 9, a fifth preferred embodiment is a modification made on the basis of the fourth preferred embodiment. The second upper end section 12 has a top on which a plurality of second positioning pegs 14 is provided. The mold frame 3 forms a plurality of second mounting holes 32 corresponding to the second positioning pegs 14. The plurality of second positioning pegs 14 is respectively fit into the second mounting holes 32 to thereby fix the resilient block wall 1 to the mold frame 3. In the instant preferred embodiment, through fixing the resilient block wall 1 with the second positioning pegs 14, the arrangement of the third recess 72" in the mold frame 3 can be omitted.

To set up, the second positioning pegs 14 of the resilient block wall 1 are respectively fit into the second mounting holes 32. Then, the mold frame 3 with the resilient block wall 1 fixed thereto is moved downward to mount to the backplane 2 so that after the mounting, the bottom face 16 of the resilient block wall 9 is set in tight engagement with the upper surface of the light guide plate 6 and the upper surfaces of the LED lights 54 to provide an effect of preventing light leak. The side face 18 of the resilient block wall 1 is in tight engagement with a surface of the PCB 52 to thereby fix and thus prevent the resilient block wall 1 from shifting.

Figure 10:
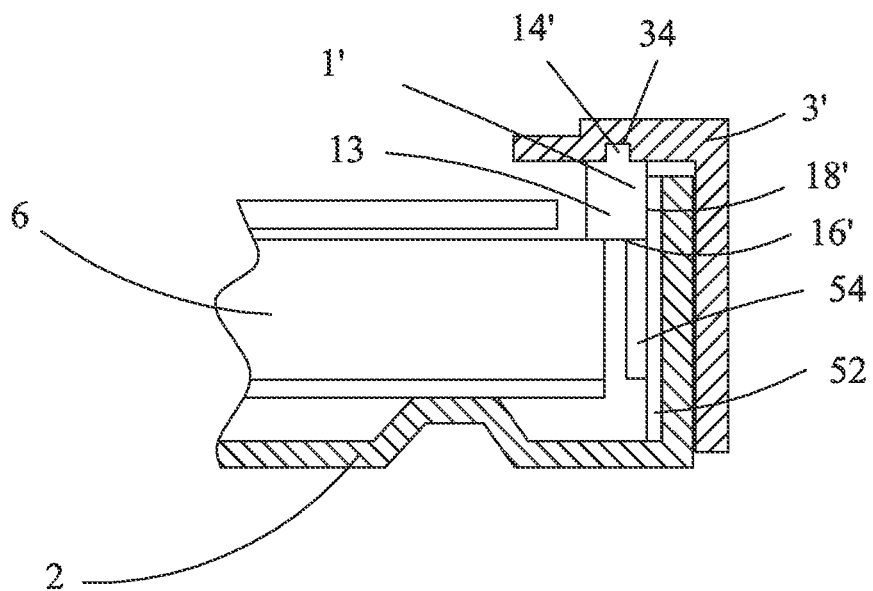
FIG. 10 is a schematic view showing a backlight module according to a sixth preferred embodiment of the present invention.
Figure 11:
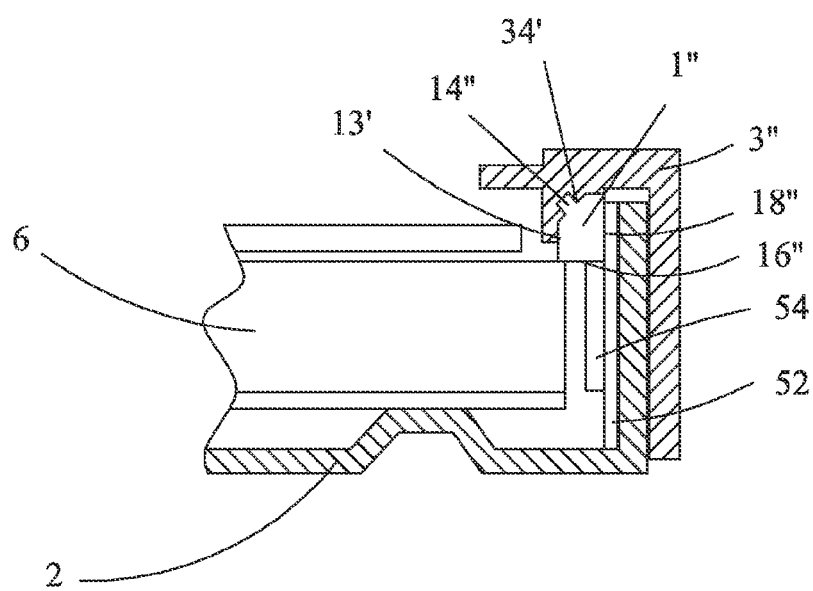
FIG. 11 is a schematic view showing a different arrangement of the backlight module according to the sixth preferred embodiment of the present invention.

Referring to FIG. 10, in a sixth preferred embodiment that might serve as an alternative solution, the resilient block wall 1' has an end that is arranged as a raised configuration, which comprises a base 13 and a projection 14' formed on the base 13. The mold frame 3' forms a fourth recess 34 corresponding to the projection 14'. The projection 14' is fit into the fourth recess 34 to thereby fix the resilient block wall 1' to the mold frame 3'. In the instant backlight module, the projection 14' is formed on the top of the base 13. However, it is not limited to such an arrangement. As shown in FIG. 11, the projection 14" is formed on a corner at the side of the base 13' adjacent to the light guide plate 6. The mold frame forms a fifth recess 34' corresponding to the projection 14". In the instant backlight module, an aluminum extrusion (not shown) that is of a split arrangement is arranged between the backlight source 5 and the backplane 2 to efficiently transmit heat emitting from the backlight source 5 to the backplane 2.

To set up, the projection 14' of the resilient block wall 1' with a raised configuration (or the projection 14" of the resilient block wall 1") is fit into the fourth recess 34 of the mold frame 3' (or the fifth recess 34' of the mold frame 3"). Then, the mold frame 3' (3") with the resilient block wall 1' (1") fixed thereto is moved downward to mount to the backplane 2 so that after the mounting, the bottom face 16' (16") of the resilient block wall 1' (1") is set in tight engagement with the upper surface of the light guide plate 6 and the upper surfaces of the LED lights 54 to provide an effect of preventing light leak. The side face 18' (18") of the resilient block wall 1' (1") is in tight engagement with a surface of the PCB 52 to thereby fix and thus prevent the resilient block wall 1' (1") from shifting.

In summary, the present invention provides a backlight module, which comprises a resilient block wall that is made of white rubber and possess resiliency and is fixed to a mold frame by means of force-fitting, bonding, or snap fitting to be in tight engagement with upper surfaces of a light guide plate and LED lights to reflect light back into the light guide plate thereby well prevent light from projecting through gaps at the light incidence side so as to overcome the problem of leak occurring at the light incidence side of the backlight module to improve the luminous efficacy of the backlight module.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising a backplane, a reflector plate arranged inside the backplane, a light guide plate arranged on the reflector plate, an optic film assembly arranged above the light guide plate, a backlight source arranged inside the backplane and corresponding to the light guide plate, a mold frame mounted to the backplane, and a resilient block wall that is arranged above the backlight source and a light incidence end of the light guide plate and is fixed to the mold frame by means of force-fitting, bonding, or snap fitting, the resilient block wall having a bottom face and a side face perpendicular to the bottom face, the bottom face and the side face being set in tight engagement with an upper surface of the light guide plate and the backlight source.

2. The backlight module as claimed in claim 1, wherein the backlight source comprises a printed circuit board (PCB) and a plurality of light-emitting diode (LED) lights mounted on the PCB, the bottom face of the resilient block wall being in tight engagement with upper surfaces of the LED lights, the side face of the resilient block wall being in tight engagement with a surface of the PCB.

3. The backlight module as claimed in claim 1, wherein the resilient block wall is made of white rubber.

4. The backlight module as claimed in claim 1, wherein the resilient block wall has an end face that is of an L-shape, which comprises a first upper end section, the mold frame forming a first recess corresponding to the first upper end section, the first upper end section being fit into the first recess to thereby fix the resilient block wall to the mold frame through force fitting.

5. The backlight module as claimed in claim 1, wherein the resilient block wall has an end face that is of a rectangular shape, which comprises a second upper end section, the mold frame forming a second recess corresponding to the second upper end section, the second upper end section being fit into the second recess to thereby fix the resilient block wall to the mold frame.

6. The backlight module as claimed in claim 5, wherein the second upper end section forms a plurality of first positioning pegs, the mold frame forming a plurality of first mounting holes corresponding to the first positioning pegs, the plurality of first positioning pegs being respectively fit into the first mounting holes to thereby fix the resilient block wall to the mold frame.

7. The backlight module as claimed in claim 5, wherein the resilient block wall further comprises a bent section extending from a side face of the second upper end section, the bent section being in tight engagement with an upper surface of the PCB, the resilient block wall being bonded and fixed to the mold frame by a double-sided adhesive tape.

8. The backlight module as claimed in claim 7, wherein the mold frame forms a third recess corresponding to the second upper end section and the bent section, the resilient block wall being fixed in the third recess by a double-sided adhesive tape.

9. The backlight module as claimed in claim 7, wherein the second upper end section forms a plurality of second positioning pegs, the mold frame forming a plurality of second mounting holes corresponding to the second positioning pegs, the plurality of second positioning pegs being respectively fit into the second mounting holes to thereby fix the resilient block wall to the mold frame.

10. The backlight module as claimed in claim 1, wherein the resilient block wall has an end that is arranged as a raised configuration, which comprises a base and a projection formed on the base, the mold frame forming a fourth recess corresponding to the projection, the projection being fit into the fourth recess to thereby fix the resilient block wall to the mold frame, the projection being formed on top of the base or on a corner at the side the base adjacent to the light guide plate.

11. A backlight module, comprising a backplane, a reflector plate arranged inside the backplane, a light guide plate arranged on the reflector plate, an optic film assembly arranged above the light guide plate, a backlight source arranged inside the backplane and corresponding to the light guide plate, a mold frame mounted to the backplane, and a resilient block wall that is arranged above the backlight source and a light incidence end of the light guide plate and is fixed to the mold frame by means of force-fitting, bonding, or snap fitting, the resilient block wall having a bottom face and a side face perpendicular to the bottom face, the bottom face and the side face being set in tight engagement with an upper surface of the light guide plate and the backlight source;

wherein the backlight source comprises a printed circuit board (PCB) and a plurality of light-emitting diode (LED) lights mounted on the PCB, the bottom face of the resilient block wall being in tight engagement with upper surfaces of the LED lights, the side face of the resilient block wall being in tight engagement with a surface of the PCB;

wherein the resilient block wall is made of white rubber; and wherein the resilient block wall has an end face that is of an L-shape, which comprises a first upper end section, the mold frame forming a first recess corresponding to the first upper end section, the first upper end section being fit into the first recess to thereby fix the resilient block wall to the mold frame through force fitting.

* * * * *